Patented Feb. 20, 1945

2,369,771

UNITED STATES PATENT OFFICE 2,369,771

REMOVAL OF SULPHUR COMPOUNDS FROM HYDROCARBON OILS

Donald C. Bond, Northbrook, Ill., assignor to The Pure Oil Company, Chicago, Ill., a corporation of Ohio No Drawing. Application April 20, 1944, Serial No. 532,000

14 Claims. (Cl. 23—184)

This invention relates to a method of removing weakly acidic sulphur compounds from hydrocarbon fluids and more particularly to the removal of mercaptans from petroleum distillates. The invention is also concerned with the regeneration of the treating solution used in removing the mercaptans from the hydrocarbon distillate. This application is a continuation-in-part of my application, Serial No. 421,250 filed December 1, 1941.

In application Serial No. 421,250 there is disclosed a method for removing mercaptans and other acidic sulphur compounds from hydrocarbon oils such as gasoline by means of alkali solution followed by regeneration of the alkali solution by contacting the solution with a gas containing free oxygen, such as air, in the presence of a small amount of a wood tar fraction boiling between approximately 240° to 300° C., as an oxidation accelerator. Wood tar fractions employed in the method disclosed in the aforesaid application are produced in the destructive distillation of wood, preferably hardwoods such as hickory, beech, aspen, maple and oak. As therein disclosed destructive distillation of such woods produces an extremely large number of decomposition products among which may be mentioned gases such as carbon dioxide, carbon monoxide, methane and hydrogen; a large number of fatty acids such as acetic, formic and propionic acids; alcohols, aldehydes, ketones, phenols, ammonia and ammonia substitution products, aromatic compounds and complex heterocyclic ring compounds. Hardwoods, such as beech and aspen, yield tar containing chiefly phenols having 2 and 3 hydroxyl groups attached to a benzene ring, such as catechol, pyrogallol and their derivatives.

I have discovered that aromatic compounds which contain 3 hydroxyl groups and/or compounds which hydrolyze in alkaline solution to yield a compound containing hydroxyl groups and in which all three of said hydroxyl groups are attached to a single benzene ring in positions immediately adjacent to each other are very effective in promoting the regeneration of used alkali solution containing mercaptides from the treatment of mercaptan-containing hydrocarbon oils. As examples of compounds or substances which are useful in accordance with my invention may be mentioned butyl pyrogallol, pyrogallol, tannic acid, gallic acid, normal butyro pyrogallol, anthragallol and hardwood tar boiling within the approximate range of 240° to 300° C. An example of hardwood tar which is suitable is U. O. P. Inhibitor No. 1, a material marketed by Universal Oil Products Company and prepared in accordance with Patents No. 1,889,835 and 1,889,836.

In practicing my invention, alkaline solutions such as aqueous sodium and/or potassium hydroxide, which may or may not contain solubility promoters such as sodium or potassium isobutyrate, sodium or potassium naphthenates, alkali metal cresylates and the alkali metal salts of the "acid oil" recovered from alkali solutions used in treating petroleum distillates containing acidic bodies of greater acidity than mercaptans, may be used to treat hydrocarbon oil containing mercaptans and other acidic sulphur compounds. Such solutions should contain not less than about 5 percent by weight of free alkali metal hydroxide, that is, alkali metal hydroxide over and above that required to react with other ingredients of the solution and may contain up to 25 percent by weight of free alkali. Two processes which are now in commercial use are known as the "Mercapsol Process" and the "Solventizer Process."

In order to regenerate the used alkali solution from the treatment of mercaptan containing oil or distillate, a small amount of the oxidation accelerator, that is aromatic compound containing 3 adjacent hydroxyl groups and/or groups which hydrolyze to hydroxyl groups in alkaline solution on a single benzene ring, is added to the used alkali and the alkali solution is contacted with a gas containing free oxygen, such as air. The amounts of catalyst which may be used may range from approximately .01 to 2 percent by weight of the solution, and generally about 1 percent or less by weight is sufficient. The alkali solution is preferably subjected to air regeneration in a counter-current contact tower containing contacting surfaces such as Raschig rings. Contact between the used alkali solution and air may take place at atmospheric temperature and pressure. Regeneration may be satisfactorily effected at temperatures of about 60 to 130° F., although lower or higher temperatures may be used. Lower temperatures require a longer time to obtain the desired degree of regeneration. Higher temperatures tend to shorten the regenerating period but may result in the formation of undesirable oxidation products. The regeneration proceeds satisfactorily at atmospheric pressure although pressures above and below atmospheric may be maintained in the regeneration zone.

In order to demonstrate the effectiveness of alkaline solutions, an aqueous sodium hydroxide was prepared containing 10 percent by weight of sodium hydroxide, 1 percent by weight of sulphur in the form of normal butyl mercaptan and to each sample of solution tested was added 1 percent of the catalyst which it was desired to test. 50 cc. of the solution was placed in a 100 cc. graduated cylinder containing 75 cc. of No. 4 glass beads. A dip tube was placed in the cylinder so that the bottom thereof extended to the bottom of the cylinder and air was passed through the tube and bubbled through the solution for 1 hour at the rate of 0.03 cubic foot per hour at a temperature of 75° F. The results obtained with the various catalysts tested are given in the following table.

*Table I*

| Catalyst | Per cent N-butyl mercaptan in solution | G. disulphide sulphur formed | Per cent N-butyl mercaptan oxidized |
|---|---|---|---|
| U. O. P. Inhibitor No. 1 [1] | 1 | 0.110 | 19.8 |
| Tannic acid | 1 | 0.154 | 27.9 |
| Gallic acid | 1 | 0.180 | 32.5 |
| Pyrogallol | 1 | 0.384 | 69.3 |
| Butyl pyrogallol | 1 | 0.493 | 89.0 |
| n-Butyro pyrogallol | 1 | 0.248 | 44.8 |
| Anthragallol | 1 | 0.150 | 27.0 |
| Rufigallol | 1 | 0.022 | 4.0 |
| Phloroglucinol | 1 | 0.003 | 0.5 |
| None | 1 | 0.005 | 0.9 |

[1] Not completely dissolved.

U. O. P. Inhibitor No. 1, tannic acid, gallic acid, pyrogallol, butyl pyrogallol, normal butyro-pyrogallol and anthragallol all fall within the class of substances or compounds which are made up entirely or in substantial part of aromatic compounds having attached to a single benzene ring 3 adjacent hydroxyl groups and/or groups which are hydrolyzable in the alkaline solution to hydroxyl groups. U. O. P. Inhibitor No. 1 showed an extremely high rate of acceleration taking into consideration the fact that it did not entirely dissolve and that the inhibitor is only composed in part of pyrogallol and pyrogallol derivatives.

Rufigallol on the other hand, which contained 3 hydroxy groups on each of the benzene rings, was comparatively ineffective as an oxidation accelerator and phloroglucinol, which contained 3 hydroxy groups in the 1-3-5 position, inhibited rather than accelerated the regeneration of the alkali solution containing the mercaptan.

In order to further demonstrate the unusual effectiveness of wood tar fractions as oxidation catalysts in the oxidation regeneration of alkaline solutions which have been employed for removing acidic sulphuric compounds from petroleum distillates, several samples of used aqueous sodium hydroxide solution were regenerated employing as catalyst the catalytic material described herein as well as several phenolic compounds. An aqueous sodium hydroxide solution containing 25 percent by weight of sodium hydroxide was contacted in an amount of 125 cc. for five minutes with 50 cc. of a solution containing 0.25% by weight of mercaptan sulphur in the form of isobutyl-mercaptan. As a result of the contacting operation, the used sodium hydroxide solution extracted isobutyl mercaptan from the benzene producing a sodium hydroxide solution containing 0.052 percent by weight of mercaptan sulphur. Four 25 cc. portions of such a sodium hydroxide solution were regenerated under identical conditions by shaking for ten minutes in contact with air at room temperature (about 80° F.), different oxidation catalysts being employed in each of the portions. 50 cc. of sweet V. M. P. naphtha was added to each portion to facilitate the separation of isobutyl disulphide formed as a result of the oxidation reaction. Other neutral water immiscible liquids such as benzene or cyclohexane may be employed as solvents for the disulphides. 0.1% by weight of each of the oxidation catalysts was employed. The results of the regeneration reactions are shown in Table II.

Since the oxidation product of isobutyl mercaptan is isobutyl disulphide, the amount of isobutyl disulphide formed is a measure of the isobutyl mercaptan oxidized and since it is also known that such disulphides are preferentially oil soluble, it is apparent that the isobutyl disulphide content of the naphtha solutions is a measure of the isobutyl mercaptan oxidized. Reference to the data in Table II shows that under identical conditions the used sodium hydroxide solution which was regenerated in the presence of 0.1% wood tar distillate produced a naphtha solution containing 0.0087 gram of isobutyl disulphide, whereas similar regeneration reactions carried out in the absence of a catalyst or in the presence of catechol, hydroquinone or p-aminophenol, converted much smaller proportions of the mercaptan compounds to disulphides. In the case of hydroquinone there was no conversion at all. The wood tar distillate, therefore, is much superior to the phenolic compounds employed by way of comparison, for the purpose of catalyzing the oxidation of used sodium hydroxide solution containing mercaptan reaction products.

In order to determine the effectiveness of air regenerated alkaline reagents for repeated use and to determine the extent of oxidation, if any, which would occur when such regenerated solutions were subsequently employed for extracting mercaptans from petroleum oils, the data shown in Table III were obtained.

*Table II*

| No. | Cc. 25% NaOH soln. | Cc. V. M. P. naphtha | Time of contact | Catalyst | Per cent catalyst added (1% by wt. of NaOH soln.) | Grams iso-butyl disulphide in naphtha |
|---|---|---|---|---|---|---|
| 1 | 25 | 50 | 10 | Wood tar distillate | 0.1 | 0.0087 |
| 2 | 25 | 50 | 10 | Catechol | 0.1 | 0.0044 |
| 3 | 25 | 50 | 10 | Hydroquinone | 0.1 | 0.0000 |
| 4 | 25 | 50 | 10 | p-Aminophenol | 0.1 | 0.0021 |
| 5 | 25 | 50 | 10 | None | 0.0 | 0.0004 |

Table III

| | Percent |
|---|---|
| Mercaptan sulphur in untreated gasoline | 0.0156 |
| Mercaptan sulphur in gasoline after treatment with fresh reagent | 0.0042 |
| Mercaptan sulphur in gasoline after treatment in absence of oxygen with air-regenerated reagent | 0.0049 |
| Disulphide sulphur in gasoline after treatment in absence of oxygen with air-regenerated reagent | 0.000 |

The mercaptan extracting reagent employed in obtaining the data shown in Table III was an aqueous sodium hydroxide reagent containing the following proportions of material by weight: 25 percent sodium hydroxide, 18.6 percent naphthenic acids and 6.4 percent commercial cresol. This reagent was employed in an amount of 7 percent by volume and was applied to a mixture of cracked and straight run gasolines. The data in Table III show that the mercaptan content of the untreated gasoline was reduced from 0.0156 percent to 0.0042 percent when fresh reagent was employed. The reagent after use was regenerated with air in the presence of wood tar distillate in the same manner as described in connection with the reagents regenerated in securing the data in Table II. Subsequent to the regeneration the reagent was blown with nitrogen to completely remove air and the thus regenerated reagent employed to treat a separate sample of the same gasoline as was used in the original treatment. The reagent lost little of its mercaptan-extracing efficiency as is shown by the fact that the mercaptan sulphur content of the untreated gasoline was reduced to 0.0049%, which is almost as low as the results obtained with fresh reagent. The sample of gasoline which had been treated with the air regenerated reagent was tested for disulphide sulphur and none was found to be present. This clearly shows that the mercaptans in the gasoline were not oxidized to disulphides when the gasoline was contacted with the reagent in the absence of the air or oxygen.

It will thus be seen that a method has been devised wherein the mercaptan sulfur content of petroleum oils is substantially reduced and the reagent employed for effecting this result regenerated in an economical manner whereby the used reagent is substantially restored to its original mercaptan extracting efficiency. The solution may be repeatedly regenerated although it may be necessary to add additional catalyst from time to time to maintain the desired efficiency.

The specific examples are given only by way of illustration and are not intended to limit the invention to the specific quantities given or the particular conditions employed, since many modifications and variations of the invention may be made without departing from the spirit and scope thereof. The only limitations imposed, therefore, are those indicated in the appended claims.

In the regeneration of the used alkali solution in order to prevent destruction of the catalyst, the mercaptide sulphur content of the alkali should not be reduced below approximately 0.3 to 0.6 percent by weight, and propyl, butyl and higher mercaptides should be eliminated from the solution to as large an extent as possible, since the higher boiling mercaptides interfere with the extraction of the mercaptans from the oil. If the mercaptide sulphur content of the new solution is reduced below approximately 0.3 percent by weight, more rapid destruction of the oxidation catalyst results, requiring larger and more frequent additions of oxidation catalyst to the solution. If care is exercised in the regeneration step, the oxidation accelerator or catalyst will last through a large number of regenerations without requiring renewal.

Although in the specific examples given sodium hydroxide solutions were used which contained no solubility promoter or contained naphthenic acid salts, it is to be understood that the invention is useful in connection with potassium hydroxide solutions either containing or not containing known solubility promoters. It is merely necessary to add the oxidation catalyst to known types of alkali solutions for extracting mercaptan from hydrocarbon oils, in amounts of approximately .01 to about 2 percent by weight in order to enable the solution to be rapidly and economically regenerated by air blowing.

In commercial practice it may be desirable to contact the regenerated alkaline solution with steam, nitrogen or other inert gas prior to recontacting the regenerated solution with oil to be treated. This precaution will insure against occlusion of oxygen in the solution and oxidation of mercaptans in the gasoline to disulphides. As a further step to insure against the formation or addition of disulphides to the gasoline, the regenerated alkaline solution, after separation of disulphides, may be washed with naphtha or other water-immiscible solvent for disulphides in order to remove any disulphides which remain suspended or occluded in the alkaline solution. It is to be understood, however, that the invention can be practiced without using either the step of inert gas contact or naphtha washing, following the regeneration. Good results can be obtained by contacting the used alkaline solution with air for a sufficient period of time to bring the mercaptan content down to approximately 0.3 to 0.6 percent by weight followed by separation from the regenerated alkaline solution of the oily layer which contains the disulphides resulting from the oxidation of the mercaptides in the alkaline solution.

In accordance with our process, removal of mercaptans from hydrocarbon oils and distillates may be carried out in a continuous process in one step of which the oil is countercurrently contacted with the regenerated alkaline solution, and in a second step of which the used alkali solution is contacted in a separate zone with air followed by separation of the oily disulphide layer from the regenerated alkaline solution and recycling of the regenerated solution to the oil treatment step.

It will of course be understood that the various components of the treating solution may be added to the solution from time to time to make up for losses which occur in the various steps of the process.

It is claimed:

1. The method of reactivating alkali solution which has been used to extract acidic sulphur compounds from hydrocarbon oil comprising contacting said solution with a gas containing free oxygen in the presence of a substance containing a substantial portion of an aromatic compound containing only three hydroxyl groups, all of which are attached to a single benzene ring in positions immediately adjacent to each other.

2. The method of reactivating an aqueous solution containing free alkali metal hydroxide which has been used to extract mercaptans from hydrocarbons within the gasoline boiling range comprising contacting said solution with air in the presence of a small amount of aromatic compound containing only three hydroxyl groups all of which are directly linked to a single benzene ring in positions immediately adjacent to each other.

3. The method in accordance with claim 2 in which the aromatic compound is present in amounts of approximately 0.01 to 2% by weight of the solution.

4. The step in the process of regenerating alkaline reagent which has been employed for the removal of weakly acidic sulphur compounds from otherwise neutral water insoluble organic fluids comprising contacting the reagent with free-oxygen-bearing gas in the presence of a modicum of the tar fraction obtained by destructive distillation of wood.

5. The step in accordance with claim 4 in which the alkali in the alkaline reagent is an alkali metal hydroxide.

6. The step in accordance with claim 4 in which the tar fraction is obtained from hardwood.

7. The step in the process of repeatedly using alkaline reagent for removing mercaptans from petroleum fluid comprising contacting the reagent with free-oxygen-bearing gas in the presence of a modicum of the oily distillate obtained from hardwood tar whereby to produce an insoluble disulphide layer and a regenerated reagent layer, separating the two layers and recovering the regenerated reagent layer for contacting additional portions of petroleum fluid.

8. The step in accordance with claim 7 in which the alkaline reagent is an aqueous alkali metal hydroxide reagent.

9. The step in accordance with claim 7 in which the oily distillate is that fraction boiling between about 240° and 300° C.

10. The step in accordance with claim 7 in which the petroleum fluid is light petroleum distillate.

11. The step in the process of regenerating aqueous alkali metal hydroxide reagent which has been employed for the removal of weakly acidic sulphur compounds from hydrocarbon distillates comprising contacting the reagent with free-oxygen-bearing gas in the presence of a modicum of tar fraction obtained by destructive distillation of wood.

12. The step in the process of regenerating aqueous alkali metal hydroxide reagent which has been employed for the removal of mercaptans from light petroleum distillate comprising contacting the reagent with free oxygen-bearing gas in the presence of a modicum of tar fraction obtained by destructive distillation of hardwood.

13. The step in accordance with claim 12 in which the oxidation is effected at temperatures of about 60 to 130° F.

14. The step in accordance with claim 12 in which disulphides formed as a result of the oxidation step are separated from the regenerated reagent with the aid of a petroleum distillate solvent.

DONALD C. BOND.